United States Patent
Ciaffi et al.

(10) Patent No.: US 8,046,596 B2
(45) Date of Patent: Oct. 25, 2011

(54) RESET-TOLERANT AUTHENTICATION DEVICE

(75) Inventors: Marco Ciaffi, Sudbury, MA (US); Joseph Pirrotta, Framingham, MA (US); William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1160 days.

(21) Appl. No.: 11/766,301

(22) Filed: Jun. 21, 2007

(65) Prior Publication Data

US 2008/0320555 A1    Dec. 25, 2008

(51) Int. Cl.
*G06F 1/32* (2006.01)
(52) U.S. Cl. ........................ 713/300; 713/320
(58) Field of Classification Search .................. 713/300, 713/320, 323, 324, 1, 2
See application file for complete search history.

(56) References Cited

U.S. PATENT DOCUMENTS

| | | | |
|---|---|---|---|
| 4,720,860 A | 1/1988 | Weiss | |
| 5,168,520 A | 12/1992 | Weiss | |
| 5,361,062 A | 11/1994 | Weiss et al. | |
| 6,275,947 B1 * | 8/2001 | Wang | 713/300 |
| 6,625,144 B1 * | 9/2003 | El-Batal et al. | 370/364 |
| 2005/0015636 A1 * | 1/2005 | Chen et al. | 713/323 |
| 2005/0121526 A1 * | 6/2005 | Stewart et al. | 235/492 |
| 2006/0053281 A1 * | 3/2006 | Andersson | 713/159 |
| 2007/0096786 A1 * | 5/2007 | Hsieh | 327/198 |
| 2007/0260865 A1 * | 11/2007 | Kuo | 713/1 |
| 2007/0260867 A1 * | 11/2007 | Ethier et al. | 713/2 |

OTHER PUBLICATIONS

Andrew S. Tanenbaum, "Structured Computer Organization", Prentice Hall Inc., 1984, pp. 10-12.*
U.S. Appl. No. 11/671,264 filed in the name of D.V. Bailey et al. on Feb. 5, 2007 and entitled "Wireless Authentication Methods and Apparatus".
U.S. Appl. No. 111530,655 filed in the name of D.V. Bailey et al. on Sep. 11, 2006 and entitled "Tokencode Exchanges for Peripheral Authentication".

* cited by examiner

*Primary Examiner* — Chun Cao
*Assistant Examiner* — Paul Yanchus, III
(74) *Attorney, Agent, or Firm* — Ryan, Mason & Lewis, LLP (57) ABSTRACT

An authentication device comprises a processor having a reset input, a trigger source coupled to the reset input of the processor, and interface circuitry for outputting codes generated by the processor. The trigger source may comprise, for example, a trigger button having an associated switch that when actuated supplies a reset to the reset input. The processor is configured to analyze a given reset applied to the reset input to determine if the reset is an inadvertent reset or a reset generated by the trigger source. The processor generates a code responsive to the reset if the reset is determined to be a reset generated by the trigger source. The code may be supplied to a host device which communicates the code to an authentication server for authentication.

27 Claims, 6 Drawing Sheets

FIG. 15

RESET-TOLERANT AUTHENTICATION DEVICE

FIELD OF THE INVENTION

The present invention relates generally to the field of secure authentication, and more particularly to authentication tokens or other types of authentication devices that are utilized in authenticating a user to a device or system.

BACKGROUND OF THE INVENTION

User authentication tokens are typically implemented as small, hand-held devices that display a series of passwords over time. These passwords, which may be one-time passwords, are more generally referred to herein as tokencodes. A user equipped with such an authentication token reads the currently displayed password and enters it into a computer or other element of an authentication system as part of an authentication operation. This type of dynamic password arrangement offers a significant security improvement over authentication based on a static password.

Conventional authentication tokens include both time-based tokens and event-based tokens. The latter are also referred to herein as event-triggered tokens. In a typical time-based token, the displayed passwords are based on a secret value and the time of day. A verifier with access to the secret value and a time of day clock can verify that a given presented password is valid. Event-based tokens generate passwords in response to a designated event, such as a user pressing a button on the token. Each time the button is pressed, a new password is generated based on a secret value and an event counter. A verifier with access to the secret value and the current event count can verify that a given presented password is valid.

Passwords can be communicated directly from the authentication token to a computer or other element of an authentication system, instead of being displayed to the user. For example, a wired connection such as a universal serial bus (USB) interface may be used for this purpose. Wireless authentication tokens are also known in such tokens, the passwords are wirelessly communicated to a computer or other element of an authentication system. These wired or wireless arrangements save the user the trouble of reading the password from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

It is generally desirable in authentication tokens and other hand-held devices to minimize power consumption so as to conserve battery power. To this end, a processor within a given such device may be kept in a low-power "sleep" mode when not being used to generate passwords. A problem that arises for a device of this type is that the device can be susceptible to inadvertent resets, for example, resets triggered by various external sources such as electrostatic discharge, electromagnetic interference, background radiation, etc. These and other inadvertent resets can take the processor out of its low-power sleep mode even when the processor does not need to generate passwords, thereby wasting battery power. Moreover, such resets can cause unpredictable behavior in both device hardware and firmware.

Accordingly, techniques are needed for reducing the susceptibility of authentication tokens and other authentication devices to inadvertent resets.

SUMMARY OF THE INVENTION

The present invention in one or more of the illustrative embodiments described herein meets the above-identified need by providing an authentication device that is able to distinguish between those resets that are generated by an event trigger or other legitimate trigger source of the authentication device and inadvertent resets attributable to, for example, external sources such as electrostatic discharge, electromagnetic interference and background radiation. This allows a processor of the authentication device to remain in its low-power sleep mode in the presence of inadvertent resets, thereby conserving battery power.

In accordance with one aspect of the invention, an authentication device comprises a processor having a reset input, a trigger source coupled to the reset input of the processor, and interface circuitry for outputting codes generated by the processor. The processor is configured to analyze a given reset applied to the reset input to determine if the reset is an inadvertent reset or a reset generated by the trigger source. The processor generates a code responsive to the reset if the reset is determined to be a reset generated by the trigger source. The processor may analyze the given reset by utilizing information stored in a register file of the processor to identify a particular one of a number of different possible causes for the given reset, although other techniques may be used to determine the cause of a given reset.

The trigger source in an event-triggered token may comprise, by way of example, a trigger button having an associated switch that when actuated supplies a reset to the reset input. As another example, the event trigger may comprise an additional processor, such as a reset integrated circuit, that is configured to operate as a master relative to the other processor which is configured to operate as a slave. A wide variety of other types of trigger sources may be used. For example, in a time-based token, the trigger source may comprise a time of day clock or other type of clock circuitry.

In an illustrative embodiment, the processor comprises an internal random access memory and the processor is configured such that a given reset applied to the reset input does not affect contents of the internal random access memory. Furthermore, the processor is operative in a number of different modes including at least a normal operation mode and a low-power sleep mode. In such an arrangement, the processor is maintained in the low-power sleep mode if the given reset is received while the processor is in that mode and the given reset is determined to be an inadvertent reset. The processor transitions from the low-power sleep mode to the normal operation mode if the given reset is received while the processor is in the low-power sleep mode and the given reset is determined to be a reset generated by the trigger source.

A given embodiment may include power-up circuitry coupled to the trigger source. Such power-up circuitry may comprise, for example, a resistor-capacitor circuit, such as a resistor coupled between a supply voltage and the reset input, and a capacitor coupled between the reset input and ground potential. A diode may be connected in parallel with the resistor to provide voltage level tracking for the supply voltage. The power-up circuitry may further comprise a current limiter resistor coupled between a terminal of the trigger source and either a supply voltage or ground potential. Numerous other arrangements of power-up circuitry may be used in alternative embodiments.

The illustrative embodiments advantageously overcome the drawbacks of conventional authentication devices. For example, by distinguishing resets generated by an event trigger or other legitimate trigger source of an authentication device from inadvertent resets generated by undesirable interference or other external sources, a processor of the device is able to remain in its low-power sleep mode at the appropriate times, leading to reduced power consumption and longer battery life.

These and other features and advantages of the present invention will become more readily apparent from the accompanying drawings and the following detailed description.

DETAILED DESCRIPTION

The present invention will be described herein with reference to exemplary authentication devices and an associated authentication system. It is to be appreciated, however, that the invention is not restricted to use with the particular illustrative device and system configurations shown.

The term "code" as used herein is intended to include authentication information such as one-time passwords or other tokencodes, or more generally any other information that a user may be required to submit for authentication purposes. Although the illustrative embodiments will be described below in the context of passwords, it is to be appreciated that the invention is more broadly applicable to any other type of authentication information.

Figure 1:
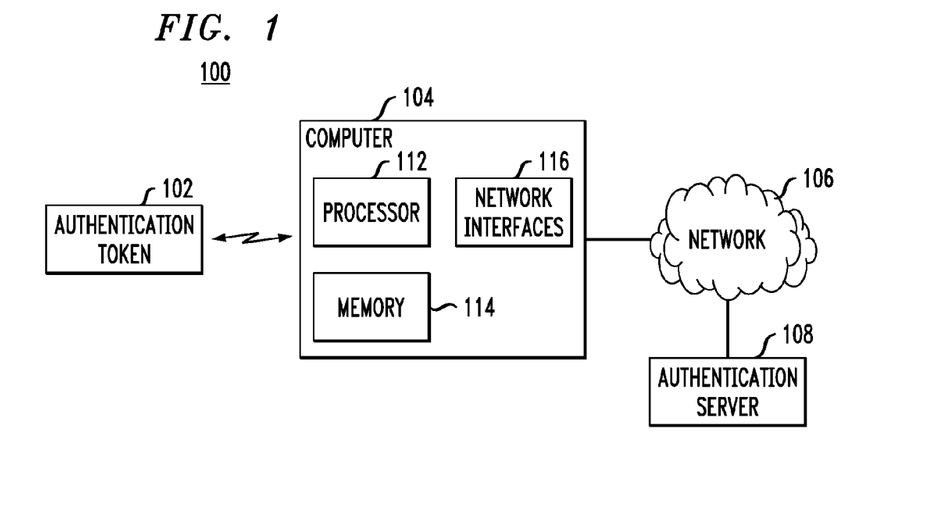
FIG. 1 is simplified block diagram showing one example of an authentication system in an illustrative embodiment of the invention.

FIG. 1 shows an example of a network-based communication system 100 which includes an authentication token 102, a host device 104, a network 106 and an authentication server 108. The authentication token is configured to generate one-time passwords or other tokencodes in a conventional manner. Such passwords may be presented to a user via a display of the token, such that the user can manually enter a given password into a user interface of the host device 104. Alternatively, a given password may be communicated directly from the authentication token via a wired or wireless connection between that device and the host device. By way of example, the authentication token may be configured to communicate with the host device 104 via a wired connection such as a USB interface, or via a wireless connection such as a Bluetooth or IEEE 802.11 connection.

It will be assumed for purposes of illustration that the authentication token 102 is an event-based authentication token, also referred to as an event-triggered authentication token, although the disclosed techniques can be adapted in a straightforward manner for use with other types of authentication devices, including time-based authentication tokens.

The host device 104 may comprise a desktop or portable personal computer, mobile telephone, personal digital assistant (PDA), wireless email device, workstation, kiosk, television set-top box, game console, or any other information processing device that supports authentication via passwords generated by an authentication token.

It should also be noted that a given authentication device need not take the form of a stand-alone hand-held token. For example, such a device may be incorporated into another processing device, such as a computer, mobile telephone, etc.

The network 106 may comprise, for example, a global computer network such as the Internet, a wide area network (WAN), a local area network (LAN), a satellite network, a telephone or cable network, or various portions or combinations of these and other types of networks.

A wide variety of conventional authentication processes may be implemented using an authentication token, host device and authentication server arranged as shown in FIG. 1. Such processes, being well known to those skilled in the art, will not be described in further detail herein. The present invention does not require the use of any particular type of authentication process.

It is to be appreciated that a given embodiment of the system 100 may include multiple instances of authentication token 102, host device 104, authentication server 108, and possibly other system components, although only single instances of such components are shown in the simplified system diagram for clarity of illustration.

Figure 2:
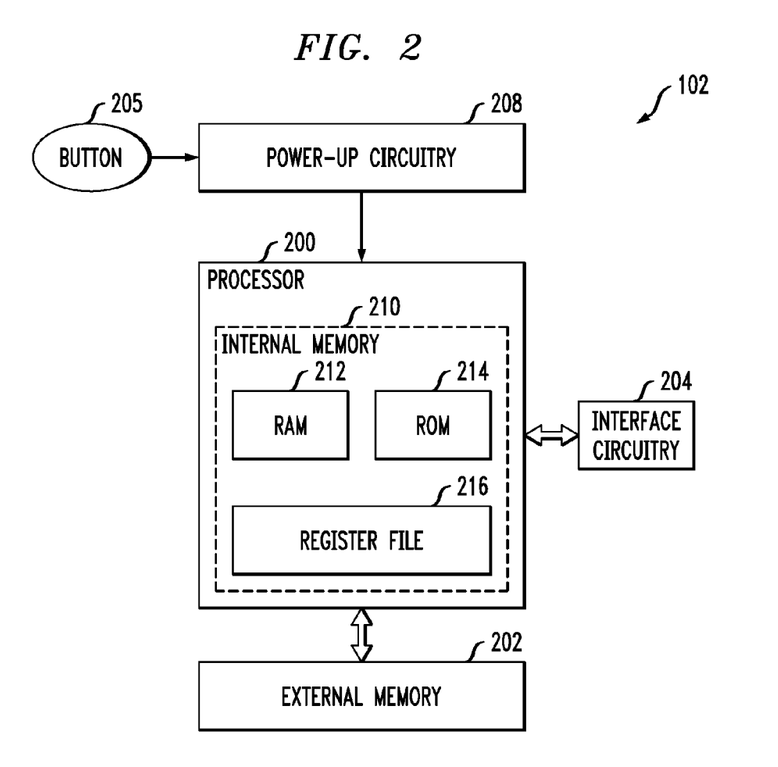
FIG. 2 shows a more detailed view of one possible implementation of an event-triggered authentication device of the FIG. 1 system.

Referring now to FIG. 2, a more detailed illustrative implementation of authentication token 102 is shown. The authentication token in this embodiment comprises a processor 200 coupled to an external memory 202. The memory 202 is referred to as "external" in that it is external to the processor 200. It should be noted that the external memory is entirely optional. In other embodiments, the external memory 202 may be eliminated, with the token utilizing only memory that is internal to the processor 200.

Processor 200 is also coupled to interface circuitry 204 which may comprise, for example, circuitry for interfacing the authentication token 102 to the host device 104 via a wired or wireless connection, or circuitry for generating a visual or audible presentation of a given generated password. Thus, the interface circuitry may include, for example, wired or wireless interface circuitry such as USB, Bluetooth or 802.11 circuitry, or one or more speakers, displays and associated drivers, in any combination.

The authentication token comprises a trigger button 205 which a user depresses each time the user requires generation of a new password. This is an example of an event trigger for an event-triggered authentication token, and such an event trigger is itself an example of what is more generally referred to herein as a trigger source. The trigger button is shown as being coupled via power-up circuitry 208 to the processor 200, although other arrangements are possible. More detailed examples of the power-up circuitry 208 and its relation to the event trigger and processor will be described below in conjunction with FIGS. 4 through 15.

As indicated above, the disclosed techniques can also be implemented in time-based authentication tokens. In illustrative embodiments of such tokens, an internal time of day clock or other type of clock is used as a trigger source, and the trigger button of the event-triggered token shown in FIG. 2 may be eliminated. Trigger sources for time-based tokens may be implemented using conventional clock circuitry of a type well known to those skilled in the art. It should be noted that other types of authentication tokens may be implemented using the techniques of the invention, including, for example, hybrid tokens that utilize a combination of time-based and event-based trigger sources.

The processor 200 may be, for example, a microprocessor, a microcontroller, or another type of digital data processor. In this embodiment, the processor comprises internal memory 210, which more particularly comprises internal random access memory (RAM) 212, internal read-only memory (ROM) 214, and a register file 216. The register file may comprise, for example, control and status registers, special function registers, or other types of registers. Such a register file typically contains information about the current state of the processor and information used to control the operation of the processor. The processor will also generally include additional elements such as an instruction decoder, arithmetic logic units, and other elements typically found in a conventional processor, although such elements are not explicitly shown in the figure.

The various elements 200, 202 and 204 of FIG. 2 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a reset analysis process in accordance with an embodiment of the invention can be implemented at least in part in the form of one or more software programs that are stored at least in part in one or more of the memories 202, 210 and executed by processor 200. One or both of the memories 202, 210 may also be used for storing information used to perform password generation or other operations associated with an authentication process.

As a more particular example, the authentication device 102 may utilize a masked ROM approach in which one or more software programs for controlling operation of the device are stored in the internal ROM 214. In these and other implementations which execute software directly from internal memory 210, the external memory 202 may be eliminated.

In a given illustrative embodiment, the processor 200 is preferably configured such that it does not re-initialize its internal RAM 212 upon reset. In other words, the processor 200 is configured to support internal RAM coherence across resets. Such a processor has the ability to reset any number of times without affecting the contents of its internal RAM. In addition, the processor may be configured to include reset circuitry that can be externally triggered. Examples of commercially-available processors of this type include the LC877016A and LC877032F microprocessors from Sanyo Electric Co.

Figure 3:
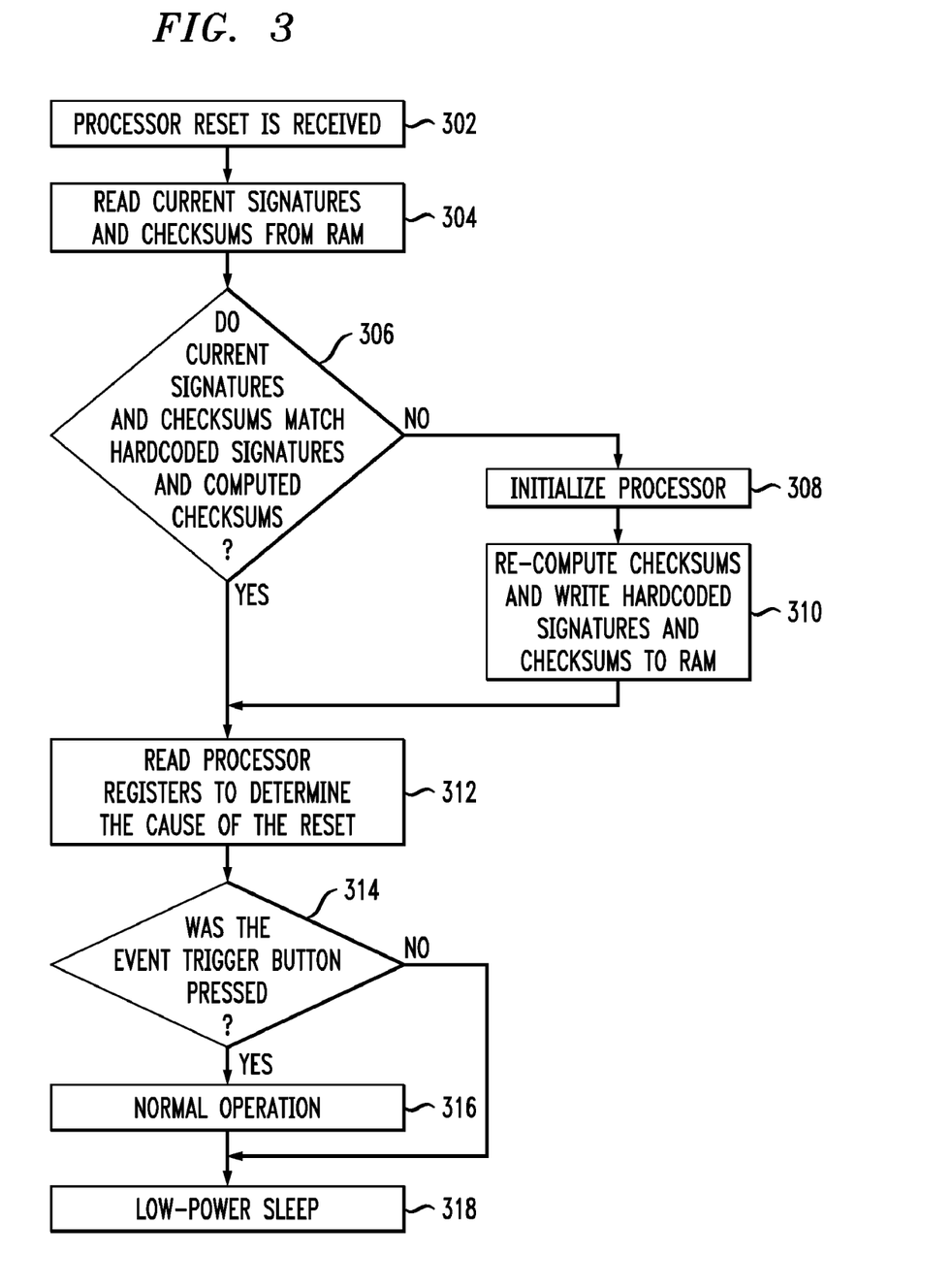
FIG. 3 is a flow diagram showing a reset analysis process in an illustrative embodiment of the invention.

FIG. 3 shows a reset analysis process that is provided in the authentication token 102. The process is implemented in the form of one or more software programs that are executed by the processor 200, and allows the token to tolerate any number of resets while still providing consistent, predictable instruction execution.

Figure 4:
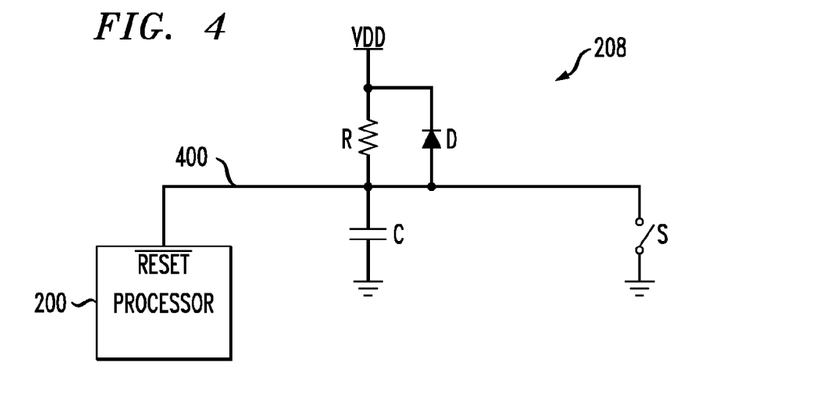
FIGS. 4 through 15 show examples of power-up circuitry and associated processor configurations of event-triggered authentication devices in accordance with illustrative embodiments of the invention.
Figure 5:
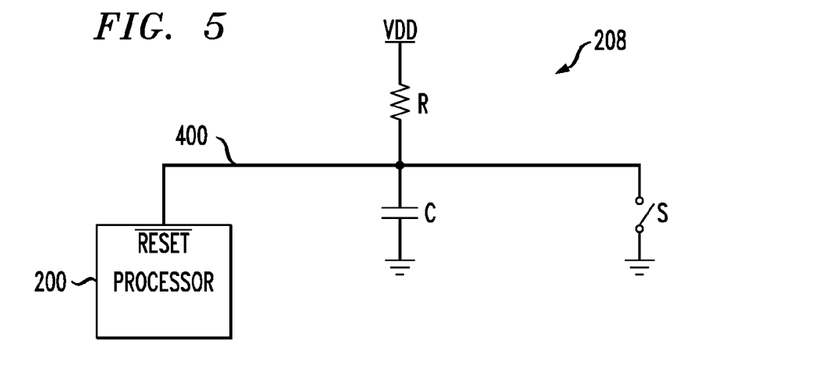

It will be assumed for description of the FIG. 3 process that the trigger button 205 is directly coupled to a reset input of the processor 200 with supporting power-up circuitry as shown in, for example, FIG. 4 or 5. Again, the disclosed techniques can be adapted in a straightforward manner for use with other types of trigger sources, including time of day clocks or other trigger sources of time-based authentication tokens, as well as combinations of such trigger sources.

Also, it will be assumed that the process utilizes multiple signatures and checksums, although other arrangements are possible. For example, alternative embodiments may utilize only a single signature, or a single checksum, or other techniques.

Examples of signatures and checksums suitable for use in the reset analysis process of FIG. 3 will now be described.

An example illustrating one possible implementation of a signature is as follows. At the time of its manufacture, the ROM 214 is written with a signature. This signature written to the ROM is also referred to herein as a hardcoded signature. The signature is in the form of a designated number of bits, such as 32 bits, having a particular value assigned thereto. This same signature is also stored in a predetermined location in the RAM 212. Upon receipt of a reset, the processor reads the predetermined location in RAM where it expects to find the signature. If the current signature as stored in RAM matches the hardcoded signature in ROM, then the device proceeds with normal operation. If the signatures do not match, it is assumed that a corruption has occurred. In this case the processor is initialized and then the hardcoded signature is copied from ROM to RAM, ready for the next reset.

Depending on how the internal RAM 212 of the processor 200 is organized, multiple signatures may be used. For example, if the processor has 2 kilobytes of RAM partitioned into 512-byte pages, four unique signatures may be used, one for each page. All of these signatures would be checked on each reset.

An example illustrating one possible implementation of a checksum is as follows. In this example, variables are assigned fixed addresses in the internal RAM 212, and a set of such variables is used to compute a given checksum that is stored in a predetermined location in RAM. Whenever one of the variables is modified, the checksum is re-computed and the resulting checksum is again stored in the predetermined location in RAM. Upon receipt of a reset, the processor computes the checksum based on the variables in the set, and compares the result to the current checksum stored in the predetermined location in RAM. If the current checksum as stored in RAM matches the computed checksum, then the device proceeds with normal operation. If the checksums do not match, it is assumed that a corruption has occurred. In this case the processor is initialized and a new checksum is computed and stored in the predetermined location in RAM, ready for the next reset.

It should be noted that there are many different ways to compute a checksum. For example, a checksum may be computed using 16-bit continuous addition, with carries ignored. So, to compute a given checksum of this type, the processor reads a first byte out of RAM and adds it to the next byte. If the sum reaches a value greater than FFFF, in hexadecimal notation, it just rolls over to 0000.

Referring now to the particular steps of the flow diagram, a processor reset is received in step 302. That is, the reset line of the processor is asserted, for example, by either an active low or active high reset signal. This may be a reset that arises from user actuation of the trigger button 205, or an inadvertent reset that should not lead to generation of a new password. Resets attributable to other causes may also be received. As noted previously, failure to distinguish between legitimate and inadvertent resets can lead to excessive power consumption and thus diminished battery power in the authentication token. The FIG. 3 reset analysis process is able to distinguish between legitimate resets generated by actuation of the trigger button 205 and inadvertent resets, thus advantageously allowing the processor 200 to remain in a low-power sleep mode in the presence of inadvertent resets.

The term "reset input" as used herein with reference to a processor is intended to be construed broadly so as to encompass, for example, any signal line, connection, pin, wire, trace or other type of input to which application of an appropriate reset signal will serve to initiate a reset of the processor. A given processor may have multiple reset inputs.

The term "inadvertent reset" as used herein is generally intended to be construed so as to encompass any type of reset which does not correspond to a legitimate reset of the processor. As indicated previously, such inadvertent resets may be attributable to electrostatic discharge, electromagnetic interference, background radiation or other conditions that are not considered legitimate reset sources in a given embodiment.

In step 304, responsive to assertion of the reset line, the processor reads current signatures and checksums from respective predetermined locations in the RAM 212. Although other arrangements are possible, as indicated above, it will be assumed for further description of the FIG. 3 process that both signatures and checksums are used. Exemplary techniques for generating such signatures and checksums were described previously.

A determination is made in step 306 as to whether or not the current signatures and checksums read from RAM 212 match respective hardcoded signatures and computed checksums. If there is no match or an incomplete match, the processor is initialized in step 308, and then as indicated in step 310, the checksums are re-computed and the hardcoded signatures and resulting computed checksums are written to the appropriate locations in RAM. If all of the current signatures and checksums match their respective stored signatures and checksums, the process moves directly to step 312, bypassing steps 308 and 310.

In step 312, one or more registers of the processor register file 216 are read to determine the cause of the reset based on information stored therein. Generally, this step utilizes information stored in the register file to identify a particular one of a number of different possible causes for the given reset, although other techniques may be used to determine the cause of a given reset. As indicated previously, possible causes for the reset include actuation of the event trigger button 205 or an inadvertent reset due to electrostatic discharge, electromagnetic interference, background radiation, etc. Examples of other possible legitimate causes of a reset include an initial application of power to the authentication token, expiration of a watchdog timer or other type of internal timer, and a temperature sensor or other type of sensor reaching a predetermined limit. Particular reset causes will lead to storage of certain information in one or more registers of the register file 216. For example, in the present embodiment it is assumed that pressing of the event trigger button results in a change in one or more state bits, such as a button_pressed state bit, stored in one of the registers of the register file. Similarly, other legitimate causes of the reset may each have one or more bits of state information stored in a register of the register file.

Inadvertent causes of the reset can thus be detected by examining the information stored in the register file to determine if any legitimate cause may have given rise to the reset. If there is no legitimate cause, it may be assumed that the reset was an inadvertent reset attributable to, for example, an external source such as electrostatic discharge, electromagnetic interference or background radiation.

A determination is made in step 314 as to whether or not the information read from the processor registers indicates that the event trigger button 205 was pressed. If the button was pressed, this is indicative of an actual legitimate reset, and the processor is placed in a normal operation mode as shown in step 316. If the button was not pressed, the processor remains in its low-power sleep mode as indicated in step 318. Also, after a period of time of normal operation in step 316, the processor may automatically transition to the low-power sleep mode as indicated in the figure.

The FIG. 3 reset analysis process can detect inadvertent resets, for example, assertions of the reset line of the processor that do not arise from a depression of the event trigger button 205. This advantageously allows the processor 200 of the authentication token 102 to remain in a low-power sleep mode in the presence of inadvertent resets, while exiting that mode in the event of an actual reset driven by actuation of the event trigger button 205. In other embodiments, other legitimate causes of a given reset may also lead the processor to enter the normal operation mode, or another desired mode of operation.

The low-power sleep mode referred to in step 318 of the present embodiment may be the lowest current sleep mode supported by the processor 200. That is, a given processor may support multiple low-power sleep modes, for example, a lowest current sleep mode in which no serial ports, button handlers, external interrupt lines or other peripheral elements of the processor are kept awake, and at least one higher current sleep mode in which one or more of such peripheral elements are kept awake. The present embodiment allows the processor to remain in the lowest current sleep mode, by coupling the event trigger directly to the reset input of the processor in the manner previously described. As a result, only the minimal processor resources required to handle resets need remain powered in this low-power sleep mode.

Various examples of the power-up circuitry 208 will now be described with reference to FIGS. 4 through 15. It is to be appreciated that the arrangements shown in these figures are merely illustrative examples, and numerous alternative circuitry arrangements may be used in implementing the invention.

Referring now to FIG. 4, one example of power-up circuitry 208 comprises a diode D, resistor R and capacitor C arranged as shown. Switch S in this example and others to be described may be considered to represent the trigger button 205 itself or a portion thereof or part of the power-up circuitry. The processor 200 in this example is assumed to operate with an active low reset and to have no internal power-up circuitry. When the switch S is closed, it forces reset line 400 to transition from a logic high level to a logic low level, thereby forcing the processor into a known state. The resistor R and capacitor C provide a delay based on an RC time constant to stabilize the reset voltage. Exemplary values for R and C in the FIG. 4 embodiment are 200 kilo ohms (K) and 2.2 microfarads (μF), respectively. The particular selected values will depend on the reset timing requirements of the processor 200, and may range from about 1K to 600K for R, and from about 0.1 μF to 10,000 μF for C. The supply voltage VDD may be, for example, 3 volts (V), although other values may be used, typically falling in the range between about 1.5 V to 5.5 V. The diode D tracks the supply voltage VDD and discharges C if VDD goes below a threshold value.

FIG. 5 shows an alternative arrangement without voltage level tracking that eliminates the diode D.

Figure 6:
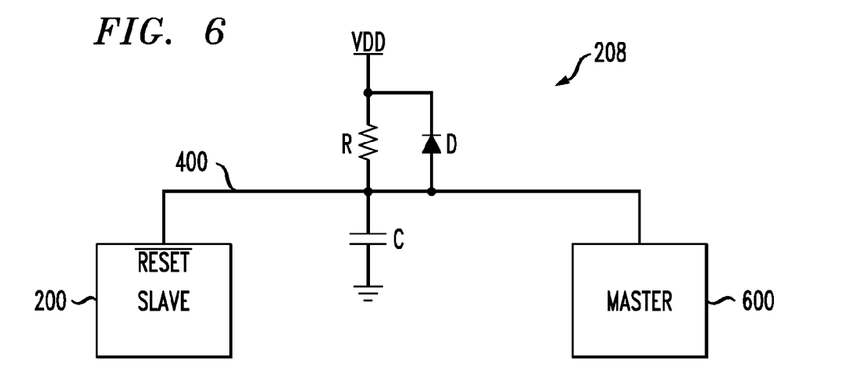
Figure 7:
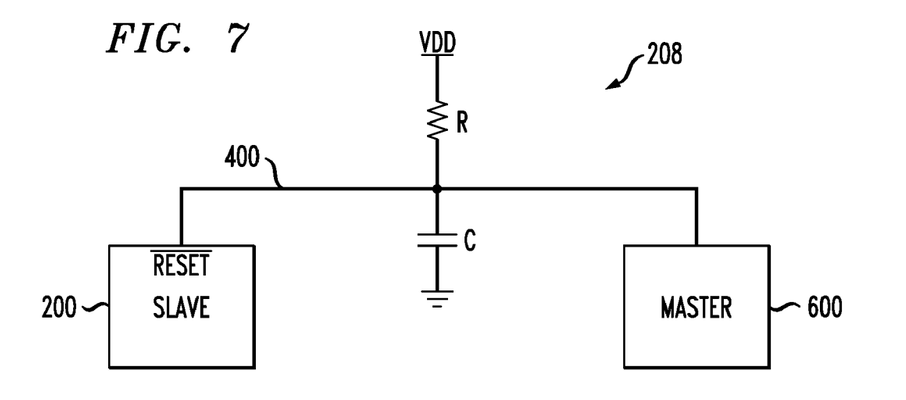

FIG. 6 shows another alternative arrangement, in which the processor 200 is a slave processor and the reset signal is generated by a master processor 600. The master processor may comprise a reset integrated circuit or other type of processing device implemented within the authentication token 102. The master processor drives the reset line 400 low in order to reset the slave processor 200 to a known state. This embodiment includes voltage level tracking of the type shown in FIG. 4 via diode D. FIG. 7 shows a version of the FIG. 6 power-up circuitry without voltage level tracking, and thus without diode D.

Figure 8:
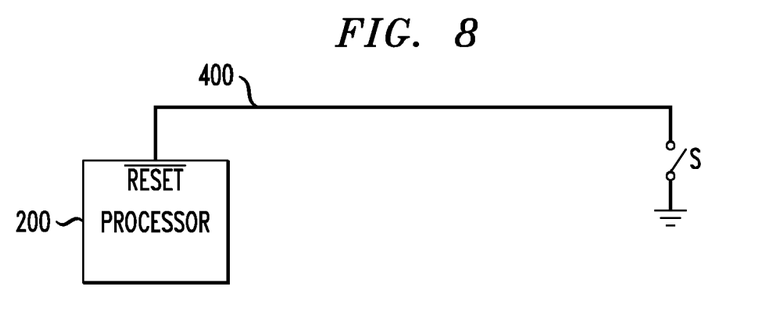
Figure 9:
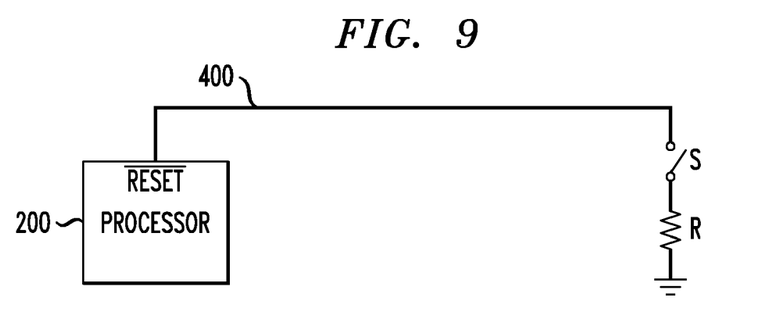
Figure 10:
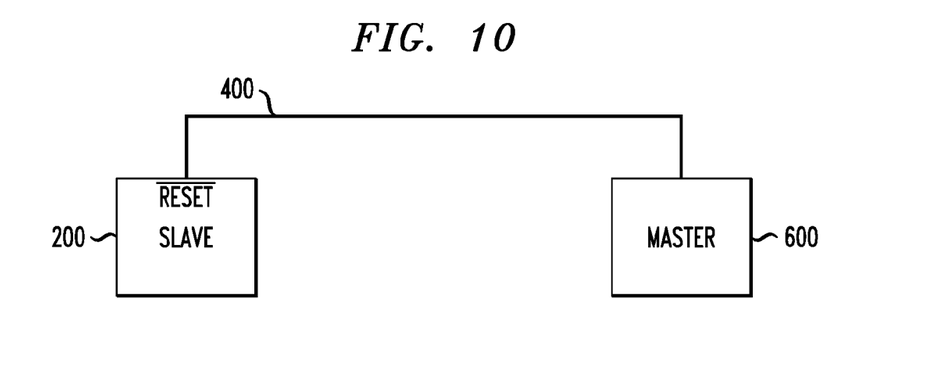

FIGS. 8, 9 and 10 show arrangements in which the processor 200 is assumed to include internal power-up circuitry. Thus, in these embodiments, the power-up circuitry 208 is internal to the processor. Again, the processor is assumed to operate with an active low reset. In FIG. 8, the switch S is connected directly to the reset input of the processor 200, with no external power-up circuitry. FIG. 9 modifies this arrangement to include a current limiter resistor coupled in series between the switch S and ground potential. Typical values for R in this example may be in the range of 1K to 1 mega ohm (M). In FIG. 10, the switch S is replaced with master processor 600, which again may comprise a reset integrated circuit. As in the FIG. 6 embodiment, the master processor drives the reset line 400 low in order to reset the slave processor 200 to a known state.

Figure 11:
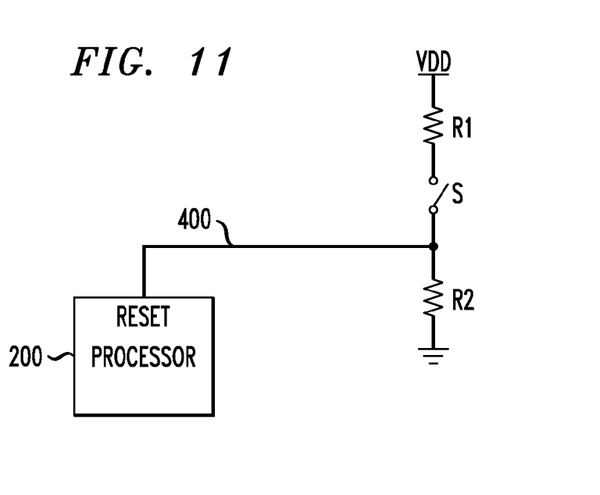
Figure 12:
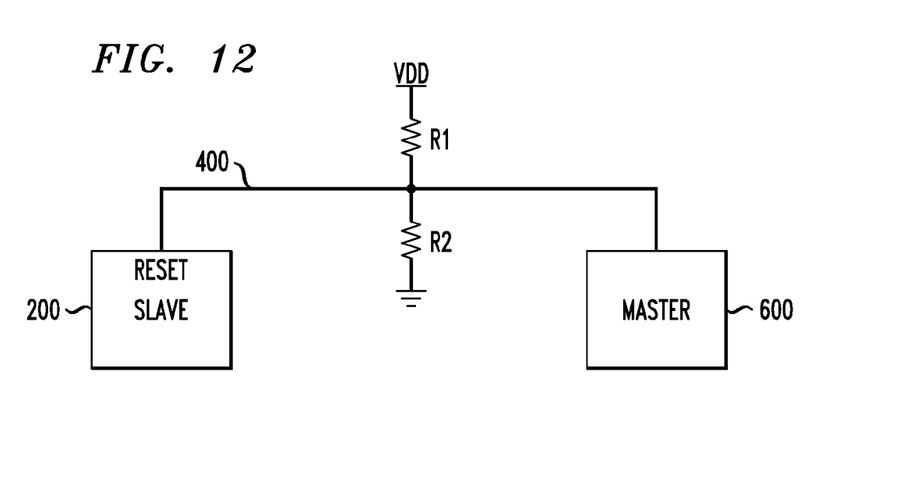

FIGS. 11 and 12 show arrangements in which the processor 200 is assumed to include no internal power-up circuitry, and is further assumed to operate with an active high reset. The values for resistors R1 and R2 are selected based on processor reset timing requirements, and may be between about 1K and 1M. Again, typical VDD values are between about 1.5 V and 5.5 V. In FIG. 11, when the switch S is closed, the reset line 400 transitions from a logic low level to a logic high level, forcing the processor 200 into a known state. In FIG. 12, the switch S is replaced with master processor 600, which again may comprise a reset integrated circuit. The master processor in this embodiment drives the reset line 400 high in order to reset the slave processor 200 to a known state.

Figure 13:
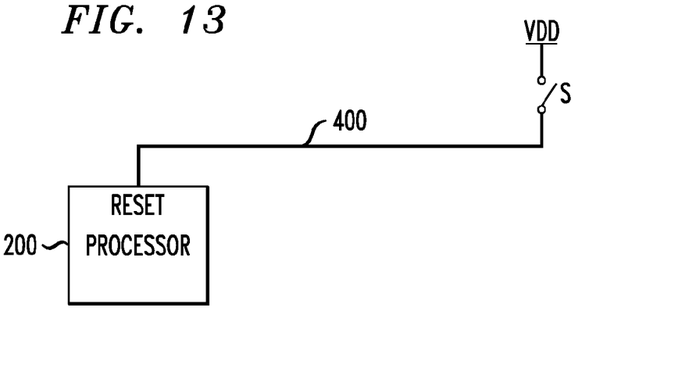
Figure 14:
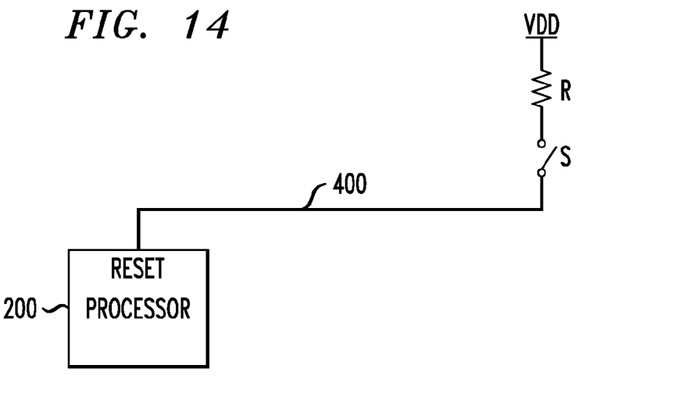
Figure 15:
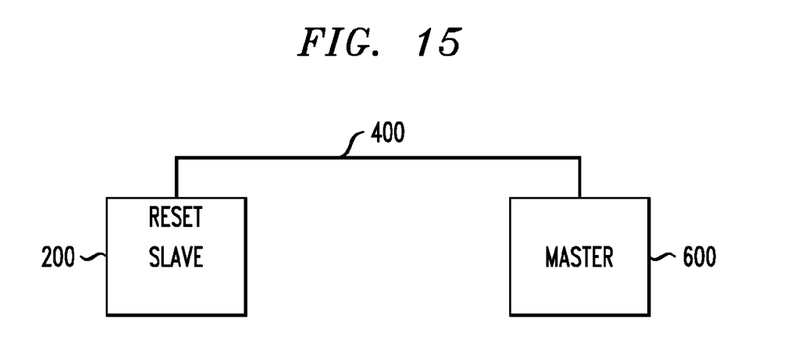

The arrangements shown in FIGS. 13, 14 and 15 are generally similar to those in respective FIGS. 8, 9 and 10, but with the processor 200 now assumed to operate with an active high reset. Thus, in FIG. 13, the switch S is coupled between the reset input of the processor and the supply voltage VDD. FIG. 14 modifies this arrangement to include a current limiter resistor coupled in series between the switch S and VDD. Again, typical values for R in this example may be in the range of 1K to 1M. In FIG. 15, the switch S is replaced with master processor 600, which again may comprise a reset integrated circuit. The master processor in this embodiment drives the reset line 400 high in order to reset the slave processor 200 to a known state.

As indicated above, the power-up circuitry arrangements shown in FIGS. 4 through 15 are presented by way of illustrative example only, and numerous alternative circuitry arrangements may be used in implementing a given embodiment of the invention.

The illustrative embodiments described above advantageously reduce the susceptibility of authentication tokens to inadvertent resets, thereby conserving battery power.

It should again be emphasized that the above-described embodiments of the invention are presented for purposes of illustration. Many variations and other alternative embodiments may be used. For example, although described in the context of event-based and time-based authentication tokens, the techniques are applicable to a wide variety of other types of authentication devices or other hand-held devices that are susceptible to inadvertent resets. Also, the particular configuration of system and device elements shown in FIGS. 1 and 2, and their interactions as shown in FIG. 3, may be varied in other embodiments. For example, the particular arrangements of signatures, checksums and processor register contents may be varied in alternative reset analysis processes. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An authentication device comprising:
   a processor having a reset input;
   a trigger source coupled to the reset input; and
   interface circuitry for outputting codes generated by the processor;
   wherein the processor is configured to analyze a given reset applied to the reset input to determine if the reset is an inadvertent reset or a reset generated by the trigger source, and to generate a code responsive to the reset if the reset is determined to be a reset generated by the trigger source; and
   wherein the processor analyzes the given reset by examining information stored in a register file of the processor to identify a particular one of a number of different possible causes for the given reset.

2. The device of claim 1 wherein the trigger source comprises a trigger button having an associated switch that when actuated supplies a reset to the reset input.

3. The device of claim 1 wherein the processor is operative in at least two different modes including a low-power sleep mode and a normal operation mode.

4. The device of claim 3 wherein the processor is maintained in the low-power sleep mode if the given reset is received while the processor is in that mode and the given reset is determined to be an inadvertent reset.

5. The device of claim 3 wherein the processor transitions from the low-power sleep mode to the normal operation mode if the given reset is received while the processor is in the low-power sleep mode and the given reset is determined to be a reset generated by the trigger source.

6. The device of claim 1 wherein the trigger source comprises an additional processor.

7. The device of claim 1 further comprising power-up circuitry coupled to the trigger source.

8. The device of claim 7 wherein the power-up circuitry comprises a resistor-capacitor circuit.

9. The device of claim 8 wherein the power-up circuitry comprises a resistor coupled between a supply voltage and the reset input, and a capacitor coupled between the reset input and a ground potential.

10. The device of claim 9 wherein the power-up circuitry comprises a diode connected in parallel with the resistor to provide voltage level tracking for the supply voltage.

11. The device of claim 7 wherein a first terminal of the trigger source is coupled to the reset input and wherein the power-up circuitry comprises a current limiter resistor coupled between a second terminal of the trigger source and one of a supply voltage and a ground potential.

12. The device of claim 1 wherein the different possible causes for the given reset identified by the information stored in the register file of the processor comprise one or more of an initial application of power to the device, expiration of an internal timer, and a sensor reaching a predetermined limit.

13. The device of claim 1 wherein actuation of the trigger source coupled to the reset input causes the processor to generate the code.

14. An authentication device comprising:
   a processor having a reset input;
   a trigger source coupled to the reset input; and
   interface circuitry for outputting codes generated by the processor;
   wherein the processor is configured to analyze a given reset applied to the reset input to determine if the reset is an inadvertent reset or a reset generated by the trigger source, and to generate a code responsive to the reset if the reset is determined to be a reset generated by the trigger source; and wherein the processor comprises an internal random access memory and the processor is configured such that a given reset applied to the reset input does not affect contents of the internal random access memory.

15. An authentication device comprising:
a processor having a reset input;
a trigger source coupled to the reset input; and
interface circuitry for outputting codes generated by the processor;
wherein the processor is configured to analyze a given reset applied to the reset input to determine if the reset is an inadvertent reset or a reset generated by the trigger source, and to generate a code responsive to the reset if the reset is determined to be a reset generated by the trigger source;
the device further comprising power-up circuitry coupled to the trigger source;
wherein the power-up circuitry comprises a first resistor coupled between the reset input and a supply voltage and a second resistor coupled between the reset input and a ground potential.

16. A method for use in an authentication device comprising a processor and a trigger source coupled to a reset input of the processor, the method comprising the steps of:
analyzing a given reset applied to the reset input to determine if the reset is an inadvertent reset or a reset generated by the trigger source; and
outputting a code responsive to the reset if the reset is determined to be a reset generated by the trigger source;
wherein the analyzing step utilizes information stored in a register file of the processor to identify a particular one of a number of different possible causes for the given reset.

17. The method of claim 16 wherein the processor is operative in at least two different modes including a normal operation mode and a low-power sleep mode.

18. The method of claim 17 further comprising the step of maintaining the processor in the low-power sleep mode if the given reset is received while the processor is in that mode and the given reset is determined to be an inadvertent reset.

19. The method of claim 17 further comprising the step of transitioning the processor from the low-power sleep mode to the normal operation mode if the given reset is received while the processor is in the low-power sleep mode and the given reset is determined to be a reset generated by the trigger source.

20. A processor-readable storage medium storing one or more software programs, wherein the one or more software programs when executed by the processor of the authentication device implement the steps of the method of claim 16.

21. An authentication system comprising:
a plurality of authentication devices;
at least one host device configured for communication with one or more of the authentication devices; and
an authentication server configured for communication with the host device;
wherein at least one of the authentication devices comprises a processor and a trigger source coupled to a reset input of the processor, said authentication device being configured to analyze a given reset to determine if the reset is an inadvertent reset or a reset generated by the trigger source, and to output a code responsive to the reset if the reset is determined to be a reset generated by the trigger source;
wherein the code is provided to the host device and communicated by the host device to the authentication server for authentication; and wherein the processor analyzes the given reset by examining information stored in a register file of the processor to identify a particular one of a number of different possible causes for the given reset.

22. The system of claim 21 wherein the analysis of the given reset further includes determining if there is a legitimate cause of the given reset by examining sets of one or more bits of state information stored in one or more registers of the register file of the processor, and wherein each of the sets of one or more bits of state information being in a particular configuration is representative of a different possible legitimate cause for the given reset.

23. The system of claim 21 wherein the different possible causes for the given reset identified by the information stored in the register file of the processor comprise one or more of an initial application of power to the device, expiration of an internal timer, and a sensor reaching a predetermined limit.

24. An authentication device comprising:
a processor having a reset input;
a trigger source coupled to the reset input; and
interface circuitry for outputting codes generated by the processor;
wherein the processor is configured to analyze a given reset applied to the reset input to determine if the reset is an inadvertent reset or a reset generated by the trigger source, and to generate a code responsive to the reset if the reset is determined to be a reset generated by the trigger source; and
wherein the analysis of the given reset further includes determining if there is a legitimate cause of the given reset by examining sets of one or more bits of state information stored in one or more registers of a register file of the processor, and wherein each of the sets of one or more bits of state information being in a particular configuration is representative of a different possible legitimate cause for the given reset.

25. The device of claim 24 wherein the analysis of the given reset further comprises identifying the given reset as an inadvertent reset if the given reset does not produce one or more bits of state information in one of the particular configurations representative of the different possible legitimate causes for the given reset.

26. An authentication device comprising:
a processor having a reset input;
a trigger source coupled to the reset input; and
interface circuitry for outputting codes generated by the processor;
wherein the processor is configured to analyze a given reset applied to the reset input to determine if the reset is an inadvertent reset or a reset generated by the trigger source, and to generate a code responsive to the reset if the reset is determined to be a reset generated by the trigger source; and
wherein the analysis of the given reset further comprises reading at least one of a signature and a checksum from a random access memory and comparing said at least one of a signature and a checksum to at least one of a corresponding respective hardcoded signature and a computed checksum.

27. The device of claim 26 wherein the processor is initialized prior to determining if the given reset is an inadvertent reset or a reset generated by the trigger source if said at least one of a signature and a checksum read from the random access memory does not match said at least one of the corresponding respective hardcoded signature and computed checksum.

* * * * *